July 20, 1926.  K. ERDMANN  1,593,163
FORMING MACHINE FOR MAKING BUILDING PLATES
Filed Feb. 5, 1925
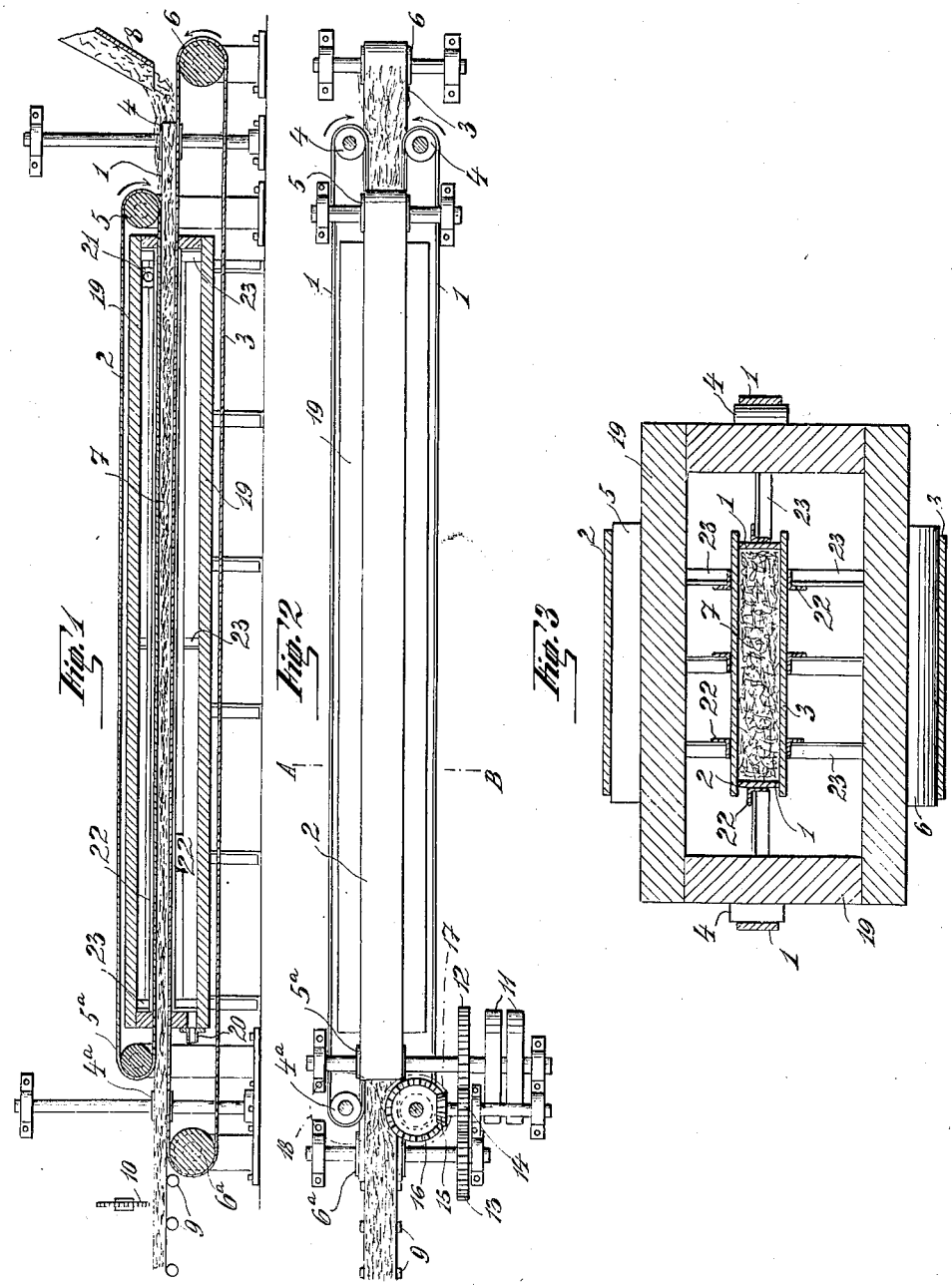
Inventor
K. Erdmann
By Marker Clerk
Attys.

Patented July 20, 1926.

1,593,163

UNITED STATES PATENT OFFICE.

KONRAD ERDMANN, OF RADENTHEIN, AUSTRIA.

FORMING MACHINE FOR MAKING BUILDING PLATES.

Application filed February 5, 1925, Serial No. 7,124, and in Austria November 4, 1924.

The invention relates to a forming machine especially adapted for making plates to be used in building, and particularly plates consisting of long-fibred materials, as for instance wood-wool, impregnated with some hardening mass, e. g. with the so-called Sorel-cement.

The invention aims at obtaining from said fibrous impregnated material plates, which include a certain total volume of hollow spaces and in which the single cavities are distributed as uniformly as possible throughout the interior of the plate. Further conditions are, that the loose structure of the fibrous material is not destroyed by the forming, that no lumps of clogged fibres are formed and that operating is simplified in comparison with the hitherto usual manner of making such plates by stuffing the impregnated fibrous material into molds. Finally continuous working is to be ensured thereby and the time of working to be reduced.

According to the present invention the members forming the plates are constituted by straps (travelling aprons, belts or the like), preferably steel straps, which are arranged and working in such manner, that they form a channel, the cross-section of which corresponds to the cross-section of the plates to be made. The impregnated loose fibrous material is brought thereby into the form of a hank or skein, which is cut into plates as soon as the impregnating mass has hardened sufficiently to allow removing the plates without the risk of breakage. In order to accelerate the hardening, the hank may be heated while passing said channel.

In the accompanying drawing a forming machine according to the invention is shown by way of example, Fig. 1 being a longitudinal sectional view, Fig. 2 the plan view and Fig. 3 a cross-section by the line A—B of Fig. 2 at an enlarged scale.

1, 1, 2 and 3 are four endless steel straps running on the rollers 4, 4ª, 5, 5ª and 6, 6ª. The sides (parts) running off from the rollers 4, 5 and 6 enclose a rectangular channel 7, the cross-section of which corresponds to that of the plate to be made. The straps 2 and 3 are broader than the distance between the inner parts of the straps 1 (see Fig. 3) whilst the breadth of the straps 1 is equal to the distance of the inner surfaces of the inner parts of the straps 2 and 3. At the entry as well as on the end of the channel the strap 3 extends beyond the length of the channel and its part before the entry of the channel, running below the chute 8, acts as a feeding device, conveying in an uninterrupted stream the loose fibrous material, sliding off the chute 8, into the channel 7. The other end acts as a discharge conveyor and as transporting device for conveying the formed hank on to a series of rollers 9 serving as a path-way. By means of a saw 10 or the like the hank is cut into plates.

For driving the steel straps pulleys 11 are mounted on the shaft of the roller 5ª, which by means of the gear 12, 13 drive the roller 6ª. With the cog-wheel 13 engages a toothed wheel 14, the rotation of which is by means of the bevel gear wheels 15, 16 transferred to the rollers 4 and 4ª.

In order to accelerate the hardening of the impregnating mass during the time the hank passes the channel 7 a chamber 19 is provided, which surrounds the said channel from all sides. In the front wall as well as in the back wall of this chamber apertures are provided, through which the straps pass, the area of these apertures being that of the cross-section of the channel, so that the interior of the chamber is fully shut off from the outside air. The air within the chamber may be heated by electric or other means, for instance by hot gases entering at 20 and escaping at 21.

The steel straps 1, 2, 3, while passing the chamber, are supported and maintained in exact position by angle rails 22, which are, by means of bearing-stays 23, secured to the walls of the chamber.

The impregnated fibrous material, sliding off the chute 8 in a continuous flow is by the rollers 4, 5 and 6 pulled into the channel and thereby slightly compressed. The degree of compression must be such, that the loose structure of the material is preserved. The material, now forming a hank, runs through the chamber 19, in which the impregnating mass hardens so far, that the hank, when leaving the channel keeps its form. On the rollers 9 the hank is then cut into plates by means of the saw 10.

What I claim is:

1. A forming machine, which consists of conveying straps forming a channel in such manner, that the bottom strap extends beyond both ends of the channel, thus constituting a feeding device on the one end thereof and a discharge conveyor at the other, a chamber surrounding the channel formed by said straps and means for accelerating the hardening of the material passing through said channel.

2. A forming machine, consisting of a channel, the side walls of which are formed by conveying straps in such manner, that the straps forming the bottom and the top of the channel are laterally extending beyond the side straps and that the bottom strap extends beyond both ends of the channel, thus constituting a feeding device at the one end of the channel and a discharge conveyor at the other end thereof, a hardening chamber surrounding the channel and means for heating the interior of the hardening chamber.

3. A forming machine, consisting of a channel, the side walls of which are formed by conveying straps in such manner, that the straps forming the bottom and the top of the channel are laterally extending beyond the side straps and that the bottom strap extends beyond both ends of the channel, thus constituting a feeding device at the one end of the channel and a discharge conveyor at the other end thereof, a hardening chamber surrounding the channel, provided with apertures corresponding to the cross-section of the channel, and means for heating the interior of the hardening chamber.

4. A forming machine, consisting of a channel, the side walls of which are formed by conveying straps in such manner, that the straps forming the bottom and the top of the channel are laterally extending beyond the side straps and that the bottom strap extends beyond both ends of the channel, thus constituting a feeding device at the one end of the channel and a discharge conveyer at the other end thereof, a hardening chamber surrounding the channel, provided with apertures corresponding to the cross-section of the channel, guiding rails arranged within the hardening chamber for supporting the straps, and means for heating the interior of the hardening chamber.

5. A forming machine, consisting of a channel, the side walls of which are formed by conveying straps in such manner, that the straps forming the bottom and the top of the channel are laterally extending beyond the side straps and that the bottom strap extends beyond both ends of the channel, thus constituting a feeding device at the one end of the channel and a discharge conveyor at the other end thereof, a hardening chamber surrounding the channel and provided with apertures corresponding to the cross-section of the channel, guiding rails arranged within the hardening chamber for supporting the straps, means for heating the interior of the hardening chamber and means for cutting the formed hank into plates.

In testimony whereof I have affixed my signature.

KONRAD ERDMANN.